(12) United States Patent  McKinley

(10) Patent No.: US 12,513,501 B2
(45) Date of Patent: Dec. 30, 2025

(54) EMERGENCY COMMUNICATION SYSTEM

(71) Applicant: Daphne McKinley, Monaco (MC)

(72) Inventor: Daphne McKinley, Monaco (MC)

( * ) Notice: Subject to any disclaimer, the term of this patent is extended or adjusted under 35 U.S.C. 154(b) by 371 days.

(21) Appl. No.: 18/023,923

(22) PCT Filed: Sep. 1, 2021

(86) PCT No.: PCT/IB2021/057994
§ 371 (c)(1),
(2) Date: Feb. 28, 2023

(87) PCT Pub. No.: WO2022/049506
PCT Pub. Date: Mar. 10, 2022

(65) Prior Publication Data
US 2024/0015492 A1    Jan. 11, 2024

(30) Foreign Application Priority Data

Sep. 1, 2020   (GB) ...................................... 2013720

(51) Int. Cl.
*H04W 4/90*    (2018.01)

(52) U.S. Cl.
CPC ..................... *H04W 4/90* (2018.02)

(58) Field of Classification Search
CPC .......... H04W 4/90; G06Q 50/40; G06Q 50/26
See application file for complete search history.

(56) References Cited

U.S. PATENT DOCUMENTS

2012/0218102 A1* 8/2012 Bivens ................. G08B 25/003
340/539.11
2023/0239397 A1* 7/2023 Giagnocavo ......... H04M 3/5116
379/45

OTHER PUBLICATIONS

"FIA Rally Safety Guidelines 2020", FIA, Edition 2, Jan. 31, 2020, 62 pages, URL: https://www.fia.com/file/120323/download.
International Search Report for PCT/IB2021/057994 dated Nov. 9, 2021, 3 pages.
Written Opinion of the ISA for PCT/IB2021/057994 dated Nov. 9, 2021, 7 pages.

* cited by examiner

*Primary Examiner* — Farid Seyedvosoghi
(74) *Attorney, Agent, or Firm* — Nixon & Vanderhye P.C.

(57) ABSTRACT

The present invention relates to a method for providing an emergency communications. The method includes the steps of: a central server obtaining information from at least some of a plurality of users prior to an emergency during an event; and during an emergency, the central server coordinating communications between at least some of the plurality of users via a plurality of user devices. The central server augments and/or coordinates communications using the information previously provided by the at least some of the plurality of users and at least one of the user devices is associated with emergency services.

16 Claims, 11 Drawing Sheets

(To be Continued)

(To be Continued)

(To be Continued)

(To be Continued)

Emergency: This collection contains information about the emergency contacts of a user.

Championship: This collection contains information about the championships.

Event: This collection contains information about the events of the championship like race.

Test: This collection contains information about the race tests.

ChampionshipUsers: This collection contains users who are participating in the championship.

Question: This collection contains information about a question.

TestInstruction: This collection contains information about the tests given by a user.

EmergencyService: This collection contains information about the emergency situation where any incident/accident has happened.

EventAttendees: This table contains the check-in history of users (drivers, marshals, pit crews) into a race.

EmergencyNotification: This table contains the history of notifications sent to emergency contacts of a user for any incident happens in a race.

DeletedUser: This table contains the deleted user emails.

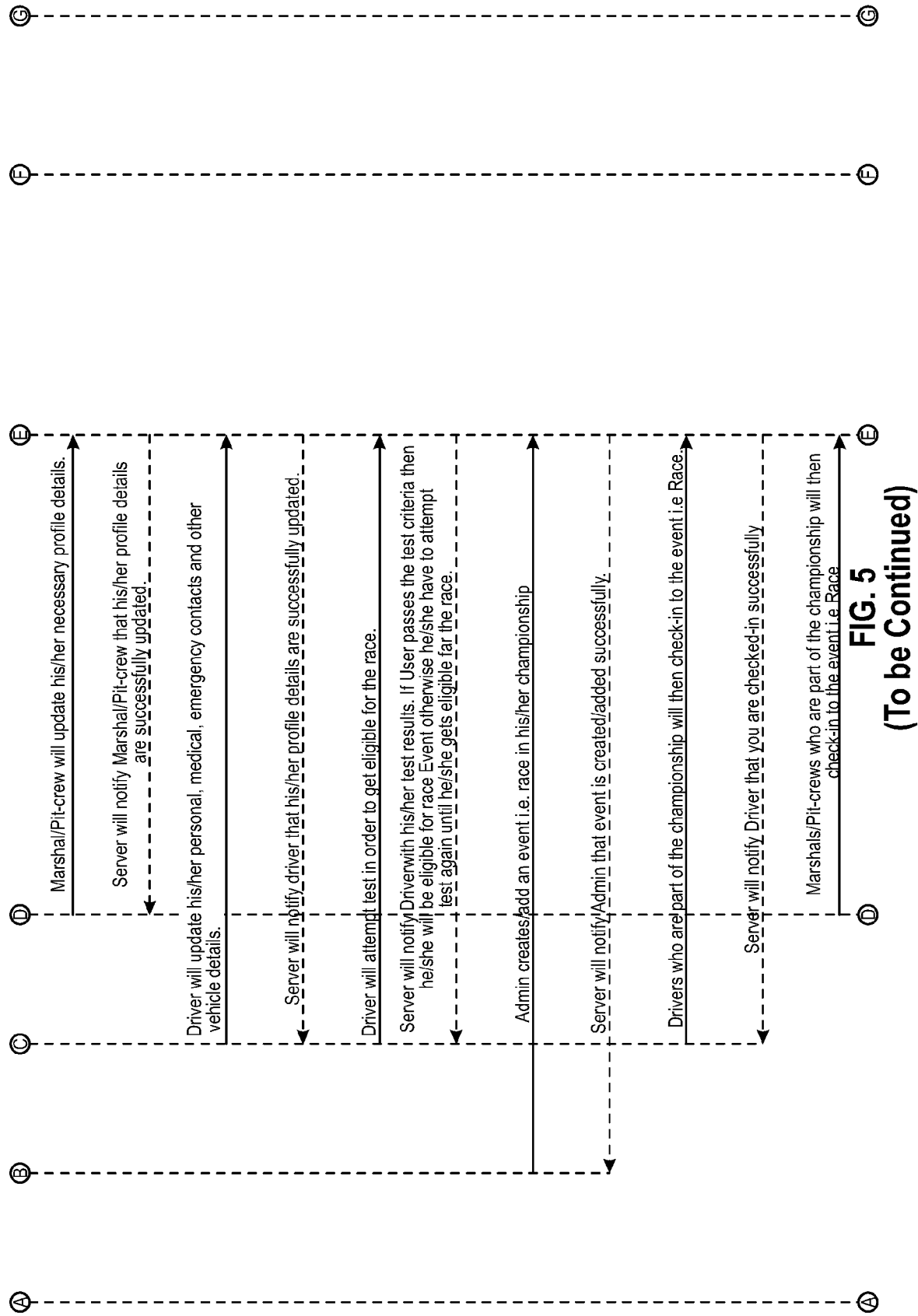

EMERGENCY COMMUNICATION SYSTEM

CROSS-REFERENCE TO RELATED APPLICATIONS

This application is the U.S. national phase of International Application No. PCT/IB2021/057994 filed Sep. 1, 2021 which designated the U.S. and claims priority to GB Patent Application No. 2013720.4 filed Sep. 1, 2020, the entire contents of each of which are hereby incorporated by reference.

FIELD OF INVENTION

The present invention is in the field of communications. More particularly, but not exclusively, the present invention relates to emergency communications systems.

BACKGROUND

Telecommunications systems provide the ability for information to be transmitted and received over long distances. Some telecommunications use wired connections, others wireless and most modern systems use a combination of both.

Emergency telecommunications systems provide higher reliability for connecting emergency services to persons at the location of emergencies in order to dispatch help or provide verbal assistance. Such systems when overlaid on existing infrastructure are provide with prioritised or dedicated channels and/or prioritised delivery of messages.

However, there is a desire for improvements to such systems to facilitate the rapid dispatch of emergency services and/or the provision of information to assist such emergency services. Such improvements are particularly desirable for higher risk endeavours or activities such as motorsports where injuries are more life-threatening. Such information when delivered to medical centres treating injured participants can mean the difference between life and death.

It is an object of the present invention to provide an emergency communications system which overcomes the disadvantages of the prior art, or at least provides a useful alternative.

SUMMARY OF INVENTION

According to a first aspect of the invention there is provided a method for providing an emergency communications, including:
  a) a central server obtaining information from at least some of a plurality of users prior to an emergency during an event; and
  b) during an emergency, the central server coordinating communications between at least some of the plurality of users via a plurality of user devices; wherein the central server augments and/or coordinates communications using the information previously provided by the at least some of the plurality of users and wherein at least one of the user devices is associated with emergency services.

According to another aspect of the invention there is provided an emergency communications system, including:
  a plurality of user devices, each associated with one of at least some of a plurality of users;
  a central server configured to obtain and store information from at least some of the plurality of users prior to an emergency during an event, and, during an emergency, coordinate communications between at least some of the plurality of users via the plurality of user devices; and
  a memory configured to store the information;
  wherein the central server augments and/or coordinates communications using the information previously provided by the plurality of users and wherein at least one of the user devices is associated with emergency services.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides an emergency communications system which accelerates the delivery of information from multiple sources to emergency services.

The inventor has determined that for activities where participants and assistants are known information can be obtained prior to the activity commencing. This information in accordance with particular roles for the individuals involved in the activity—whether participants or assistants—can be coordinated by a central server to ensure delivering of that information rapidly and accurately to appropriate emergency services without compromising any confidentiality in the information.

Figure 1:
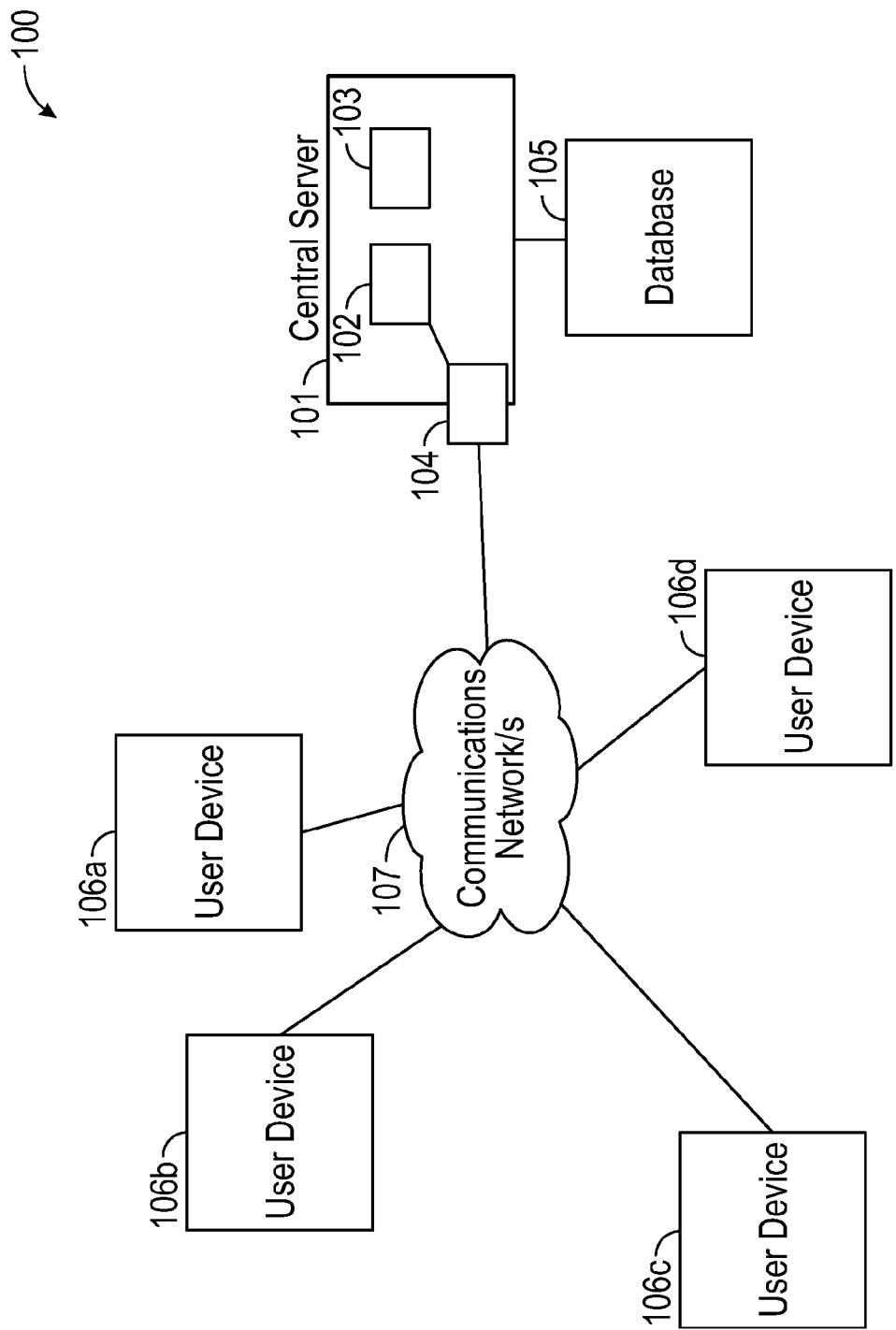
FIG. 1: shows a block diagram illustrating an emergency communications system in accordance with an embodiment of the invention.

In FIG. 1, an emergency communications system 100 in accordance with an embodiment of the invention is shown. The system 100 may be implemented for use in managing emergencies during pre-arranged events such as high risk sports events, including motorsports.

The system 100 includes a central coordination server 101. The central server 101 may include at least one processor 102, at least one local memory 103, and at least one communications apparatus 104.

The system 100 also includes a datastore 105. The datastore 105 is connected directly or indirectly to the central coordination server 101.

The system 100 also includes a plurality of communications devices (106a, 106b, 106c, and 106d, collectively 106). The communications devices 106 may be user devices. The user devices may include single-purpose communications devices for receiving and transmitting messages to and from the central coordination server, multi-purpose devices for both communication with the central coordination server and other devices and local processing, and general-purpose communication/processing devices. The user devices may include mobile devices including, at least, a processor, memory, display, input, and communications apparatus. The display/input may be combined into one such as a touch-screen display.

A least one of the communications devices (e.g. 106d) may be associated with emergency services or an emergency services user or users.

A communications network or networks (107) connects the communications devices 106 and the central coordination server 101.

The central coordination server 101 may receive information from a plurality of users prior to any emergency. The server 101 may store this information within the datastore 105. The information may include personal information, medical information, and emergency contact information relating to a participant in an event. The information may, at least in part, be received via the communications devices 106.

The central coordination server 101 may, during an emergency, coordinate and/or augment communications to and from the plurality of communications devices 106 in accordance with the information received prior to the emergency occurring. Further details on the coordination and/or augmentation actions taken by the central server 101 may be found in relation to the description corresponding to the remaining Figures.

It will be appreciated that the functions of the central server 101 may be distributed amongst a plurality of components. For example, one component of the central server 101 receiving and storing the information, and another component of the central server 101 retrieving and using the information to coordinate/augment the communications. It will also be appreciated, considering typical cloud architectures, that any components need not be physically co-located.

Figure 2:
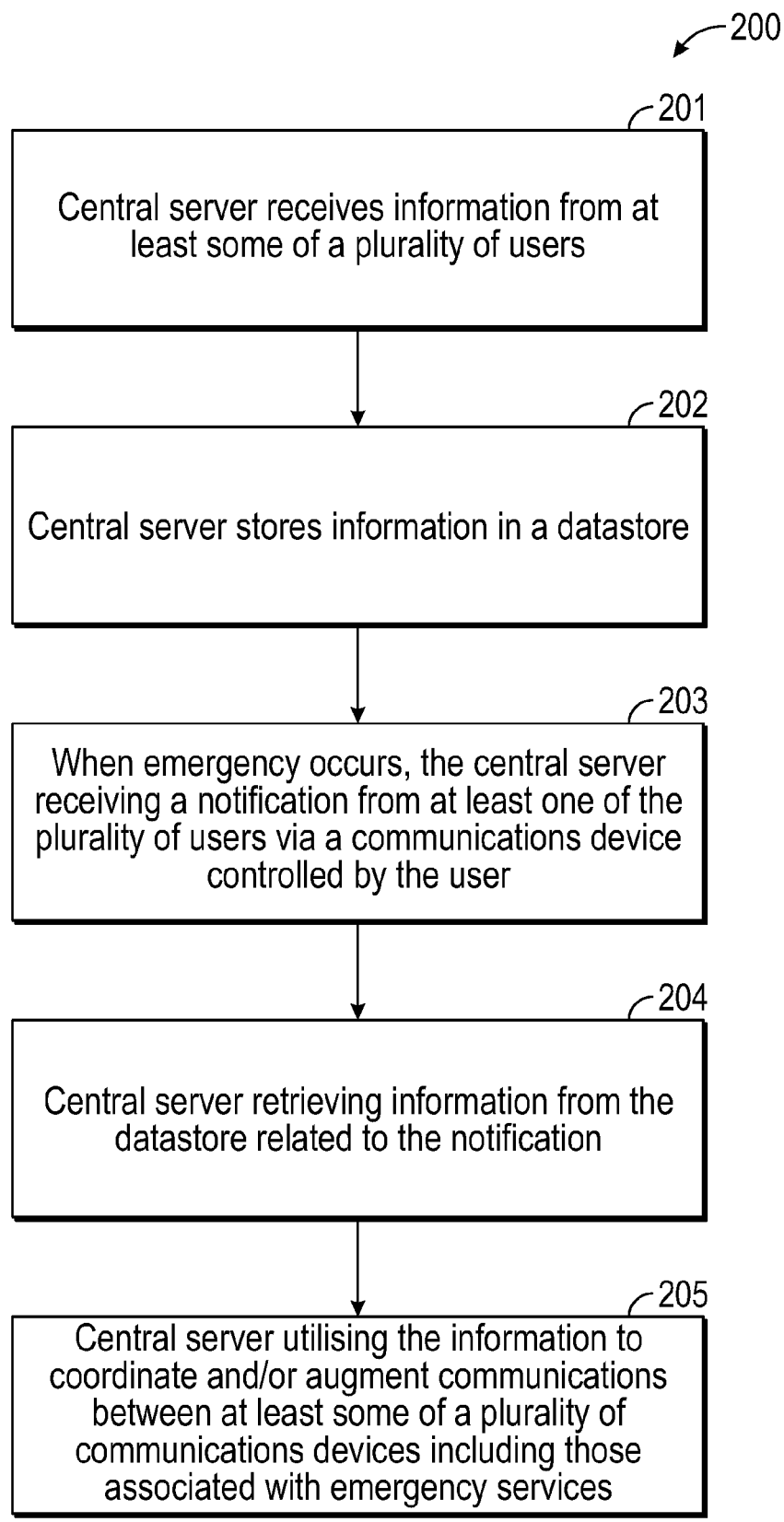
FIG. 2: shows a flow diagram illustrating an emergency communications method in accordance with an embodiment of the invention.

Referring to FIG. 2, a method 200 for delivering communications within an emergency communications system will be described. The system may be implemented for use within events as described in relation to FIG. 1.

In step 201, information is received at the central server from at least some of a plurality of users. Each of the plurality of users may be assigned or associated or defined with one of a plurality of roles. The roles may include participant, monitor, emergency services, and/or administrator. Where the event is a motorsports event, the monitor role may include a pitcrew and marshal role, and the participant may be a driver.

The information is received prior to any emergency occurring during the event. As noted above, the information may include personal information (such as name, address, date of birth), medical information (such as blood group/type, known allergies such as blood allergies, last tetanus injection date, etc.), and emergency contact details (name, relationship, contact number/details).

In step 202, the central server stores the information within a datastore. The information may be associated with an identifier for the user. For example, information relating to a participant may be stored associated with an identifier for that participant within the datastore.

During an event, at least some of the plurality of users may transmit a notification to the central server to activate their involvement with the event. The notification may be transmitted via a communications device for each user. The central server may store which of the plurality of users, with their associated role, are involved in an event.

In some embodiments, the location of at least some of the plurality of users may be updated or transmitted regularly or periodically to the central server.

In some embodiments, multiple locations may be determined for the same user. These locations may be determined at the same time or similar time using different methods, or may be captured over a period of time and associated with a time-stamp. In this way, location information can be captured which address the problems of errors (such as errors in GPS or in the user moving). Different location capturing methodologies may be utilised based upon the role of the user (for example, a marshal role may utilise a beacon or capture of a QR code at their post, and a driver role may utilise a GPS location when they arrive at the race track). The different location methods may include one or more selected from the set of mobile device GPS or A-GPS, beacon detection, and QR code scanning. It will be appreciated that this set of location methods may include additional technologies.

In step 203, when an emergency incident occurs, at least one of the plurality of users may transmit a notification to the central server of the emergency incident. The notification may include one or more of the following details: identifier/identifiers of the affected participants (e.g. victims of the incident) and location of the incident. In some embodiments, the periodically/regularly transmitted location is utilised by the central server to augment the notification.

In some embodiments, a location may be determined at the device of the user to transmit along with the notification.

In step 204, the central server may retrieve at least some of the information from the datastore. In one embodiment, the participant identifier/identifiers provided within the notification are utilised to retrieve information associated with that participant from the datastore.

In step 205, the central server may utilise the retrieved information to coordinate and/or augment communications to at least some of the communications devices. For example, a notification may be transmitted to one or more communications devices associated with emergency services augmented with the personal information, medical information, emergency contact information, and/or location of incident. In one embodiment, the central server may coordinate transmission of a notification about the emergency to a communications device associated with an administrator role. The notification may be augmented with the personal information relating to the affected participant/participants, and/or details about the incident. The central server may receive from the communications device of the administrator confirmation to proceed with transmission to one or more emergency services communications devices as noted above, and may include selection of the recipient of the transmission between a plurality of emergency service users. In one embodiment, the central server may receive a notification from the emergency services communication device including information relating to the emergency. The information may include which hospital the affected participant/participants are being transported to. The central server may utilise the emergency contact information associated with the affected participant/participants to transmit messages to an emergency contact which relate to the hospital and/or incident.

In some embodiments, the central server may coordinate and/or augment the communications using the location of the user device as the location of the incident. In these circumstances, the central server may determine the best known location of the user device (based on stored historical locations and/or locations based on different location methods) as the location of the incident, or may send several locations (for example, of the user device) to enable the recipient(s) to make an assessment themselves as to the specific location of the incident.

In some embodiments, the central server may utilise notifications from a plurality of users to coordinate and/or augment communications. For example, locations for each of the users may be used to determine the location of the incident or each of the notifications may result in several transmissions of the same incident to provide a fuller picture of the incident to the recipient(s).

In embodiments, each of the roles may be associated with an access level to the information stored within the datastore. The central server may control augmentation of communications based upon the access level associated with the role. For example, the participant roles may only be able to access information associated with their own identifier, the monitor roles may only be able to access personal details associated with participants, the administrator may be able to access all information, and the emergency services may be able to access, at least, medical details.

Figure 3:
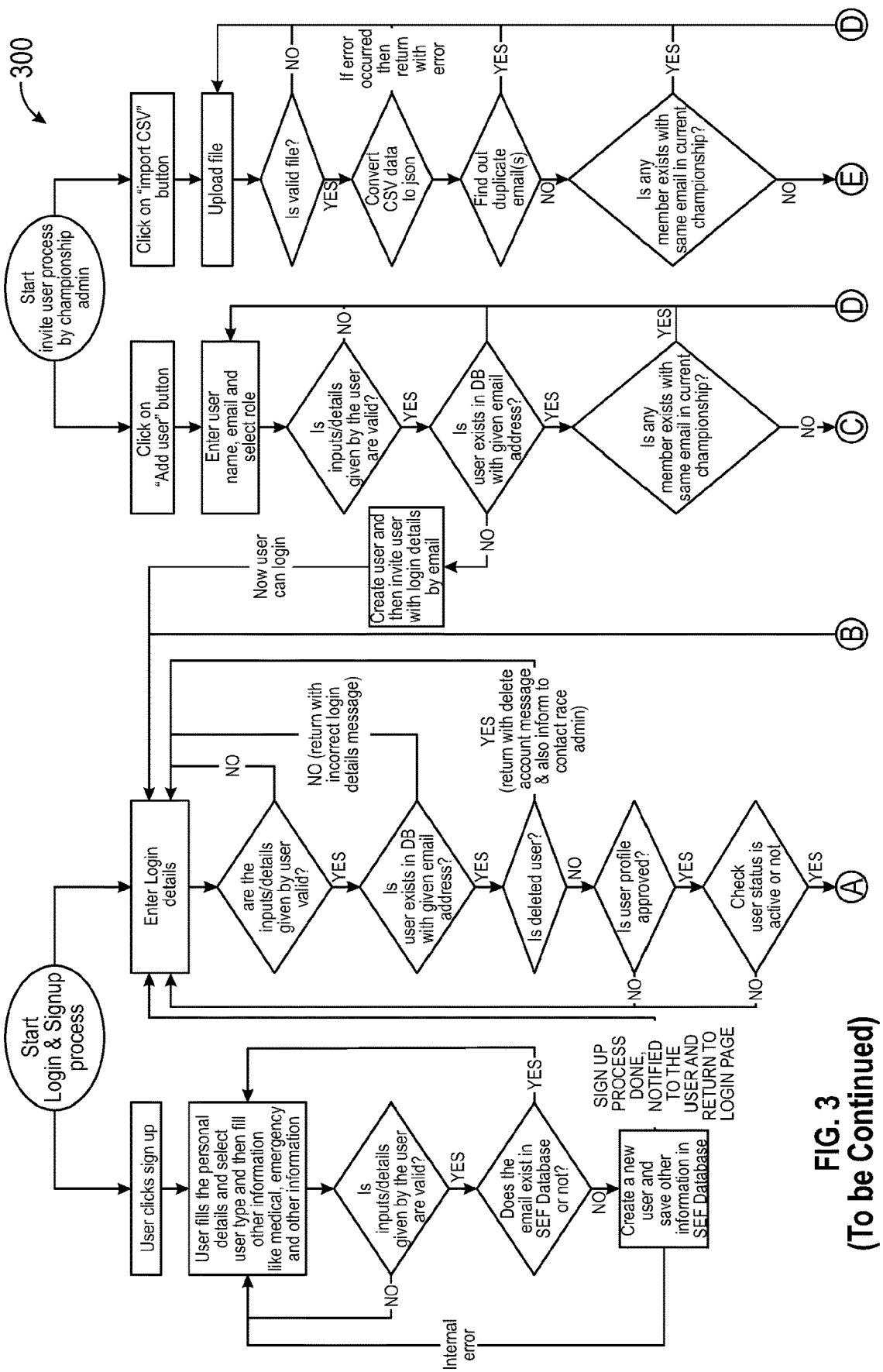
FIG. 3: shows a flow diagram illustrating an emergency communications method in accordance with an embodiment of the invention.
Figure 3:
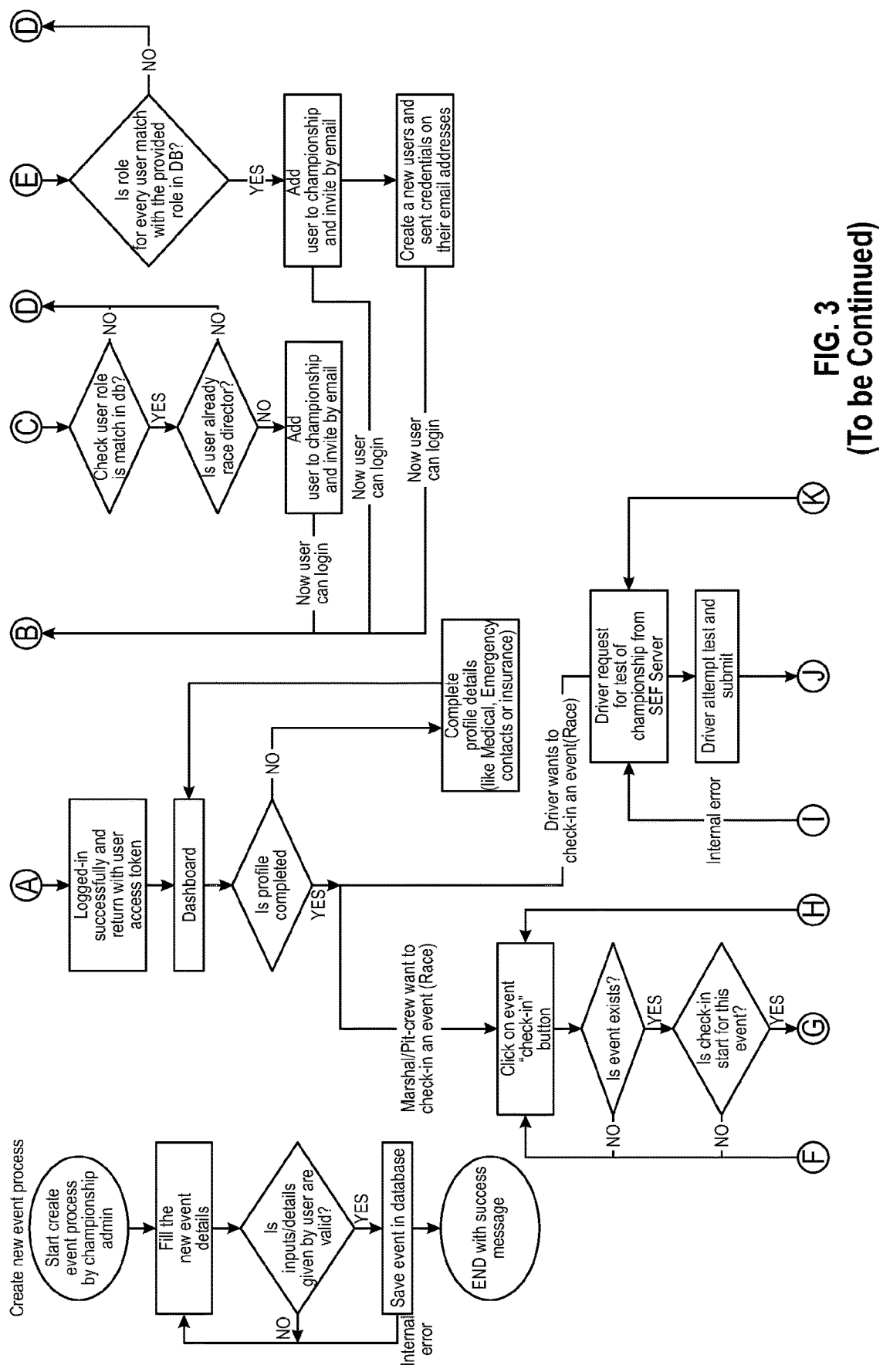
Figure 3:
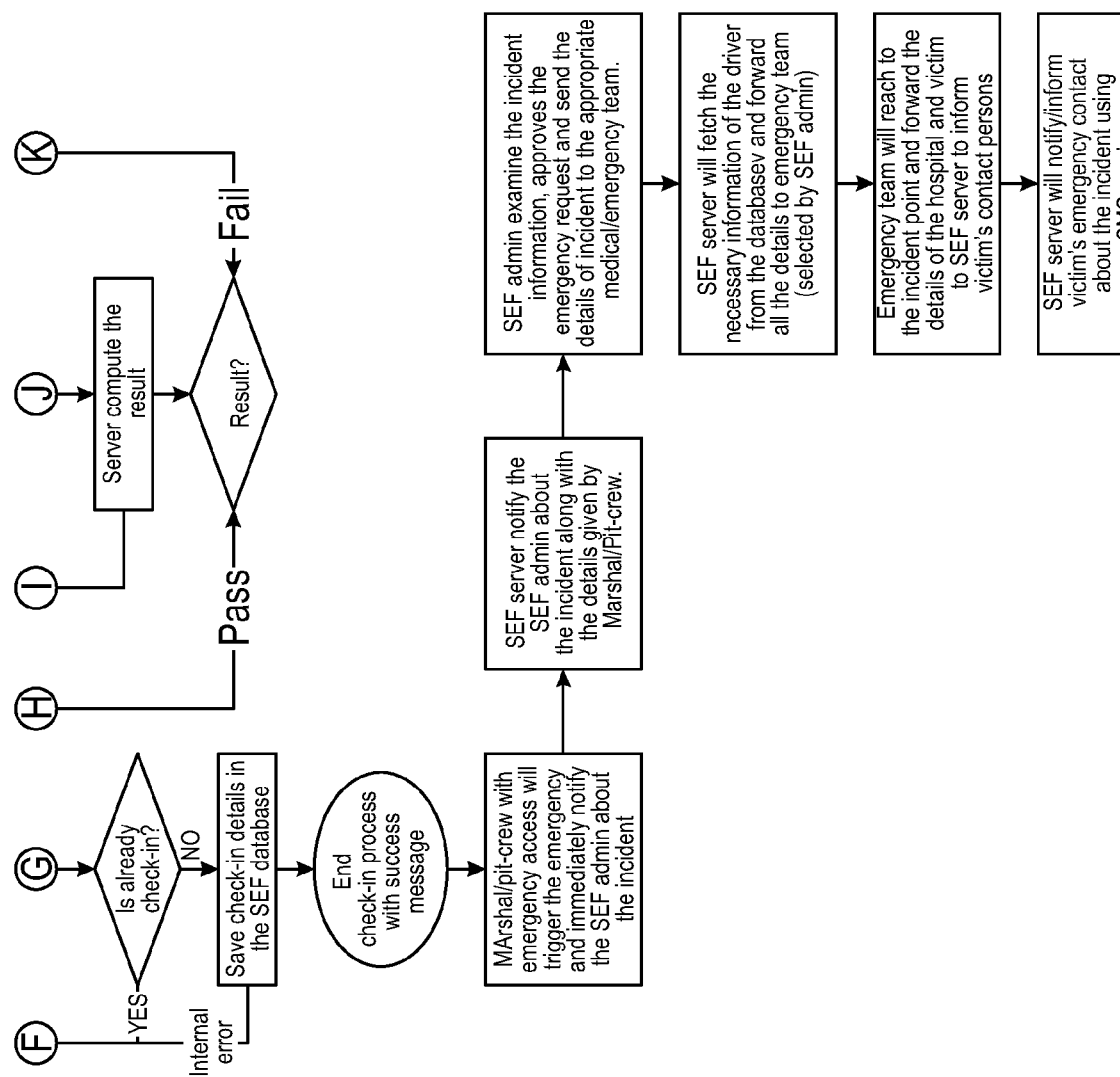
Figure 4:
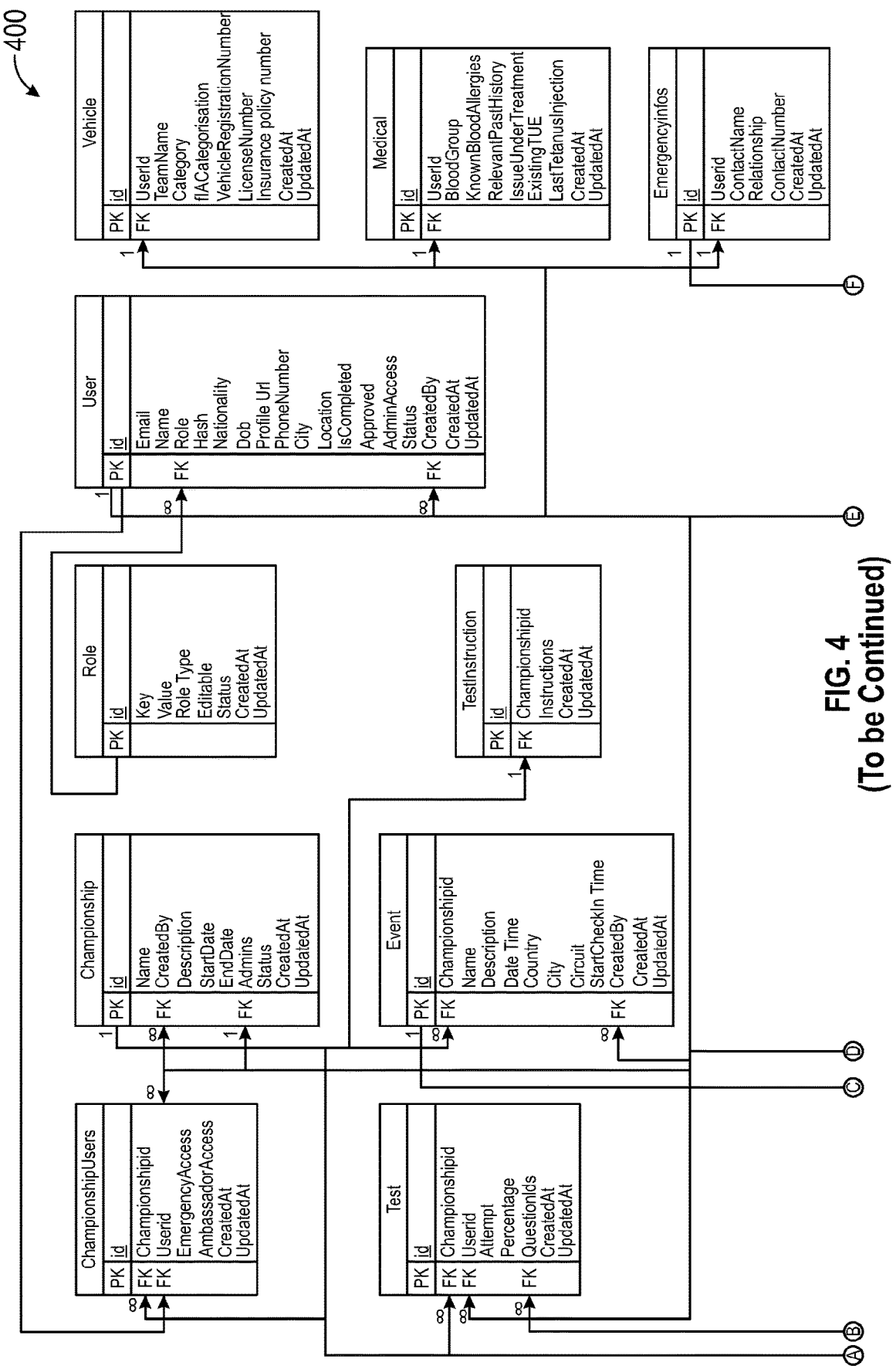
FIG. 4: shows a block diagram illustrating a datastore design for an emergency communications system in accordance with an embodiment of the invention.
Figure 4:
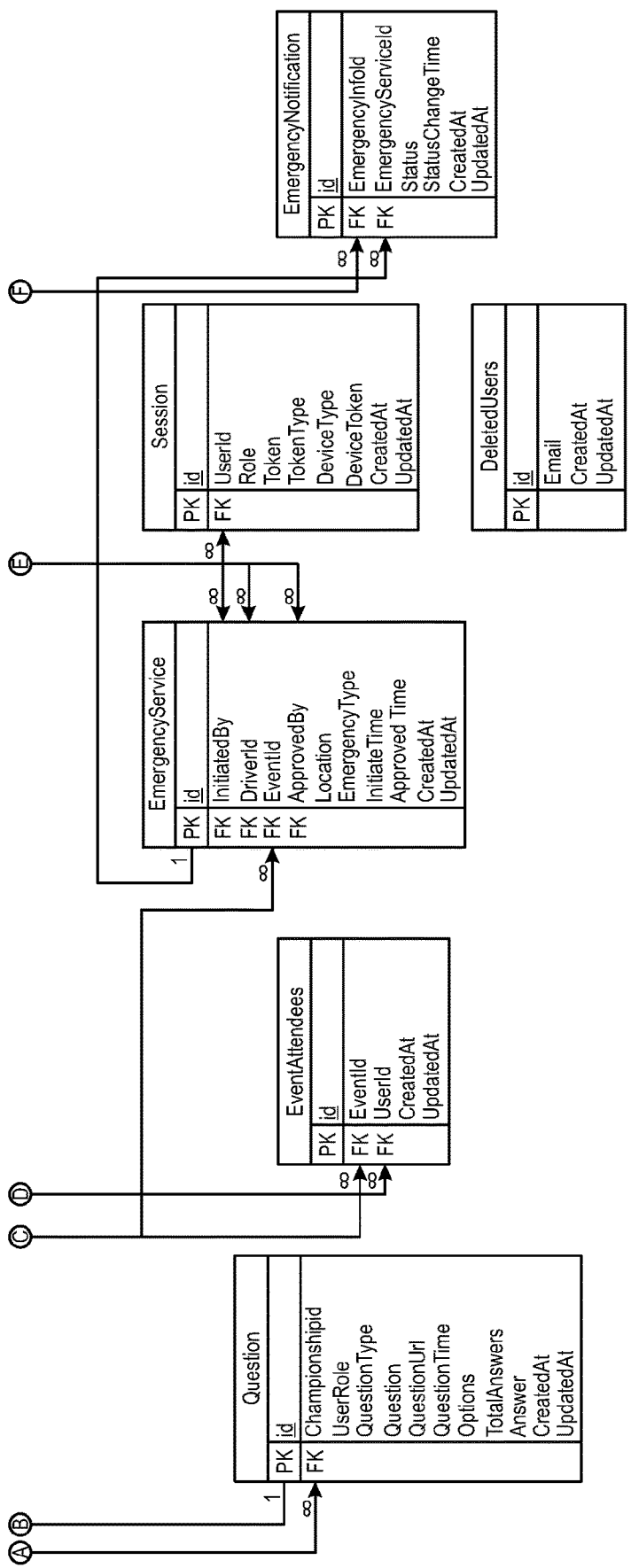
Figure 5:
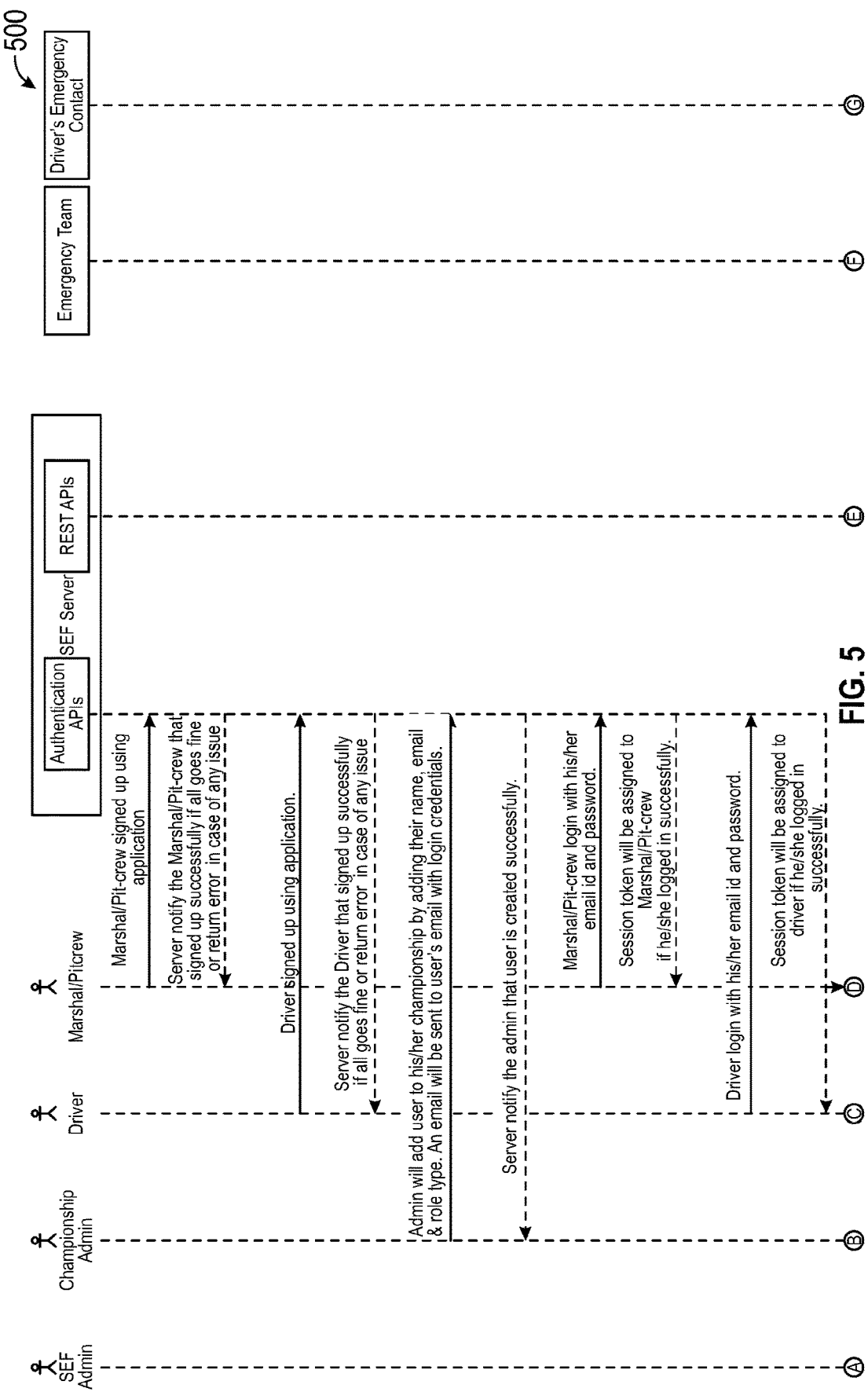
FIG. 5: shows a sequence diagram illustrating communications within an emergency communications system in accordance with an embodiment of the invention.
Figure 5:
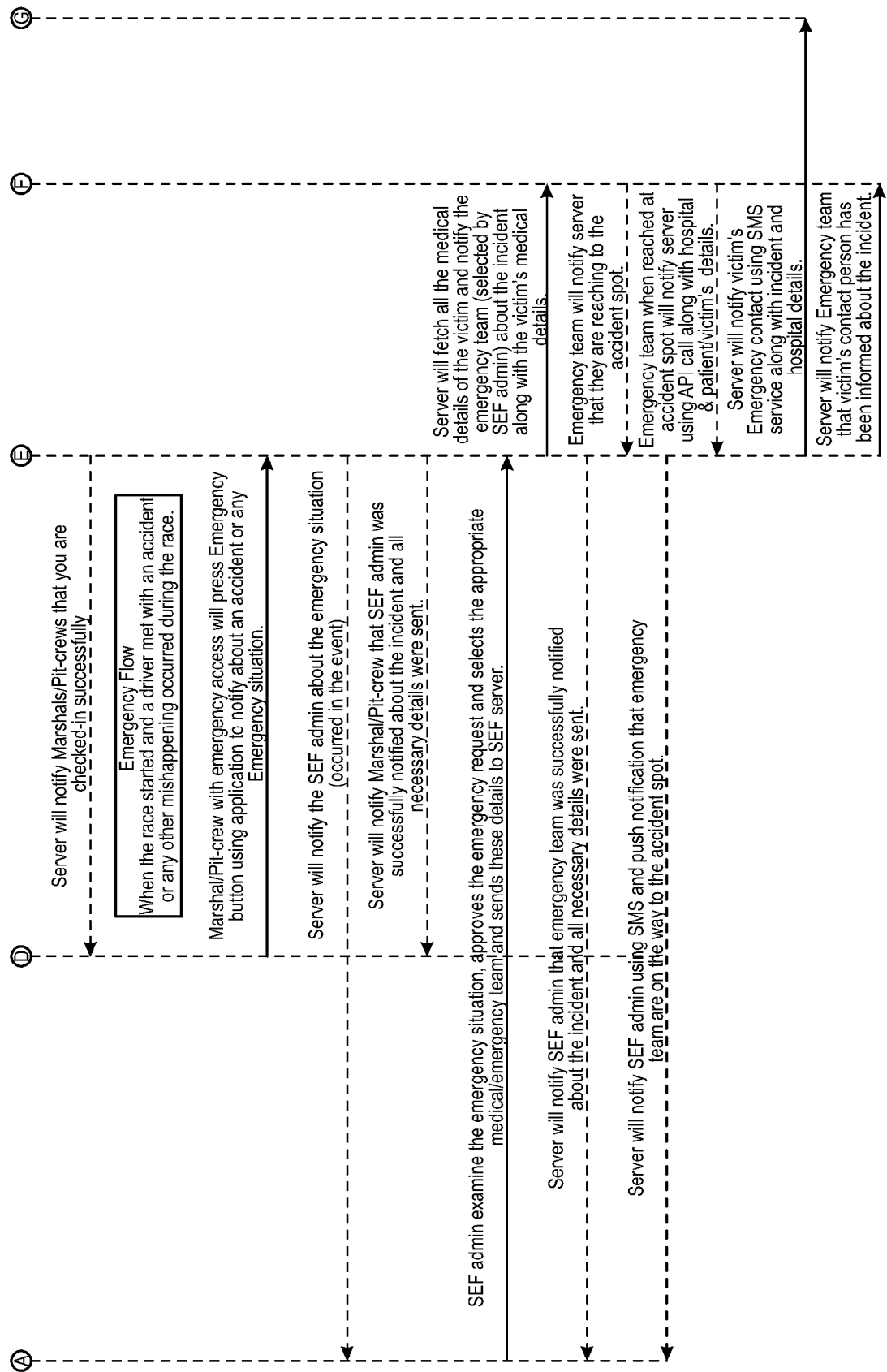

Referring to FIGS. 3, 4, and 5, embodiments of the present invention will now be described.

In this particular embodiments, the following features may be present:
1. Accounts/roles within the Database:
   SEF-Admin
   Driver
   Pitcrew (with Emergency Access)
   Marshal (with Emergency Access)
   Championship Admin
   Emergency teams
2. Details of Driver within the Database:
   Personal details (Name, Address, DOB etc.)
   Medical details (Blood group, Known blood allergies, last tetanus injection date, any issues under treatment, insurance policy details, any relevant past medical history, etc.)
   Emergency contact details (name, relationship, contact number etc.)
3. Details related to an event present in the Database:
   Championship should be added in the database.
   An Event under championship should be added in the database.
   Driver, Pit-crew and Marshal should be checked in the same event.

One or more of the following steps may be performed:
1. When an emergency incident occurs during an event then Marshal or Pit-crew will send an emergency indication to Server along with the victim's id (i.e. victim's user-id) by using a mobile application.
2. The server will then immediately notify the admin (who is the only user to have the access to examine Victim and Emergency incident's details) about the incident who will then examine all the accident details and thereby approve the emergency request.
3. The admin will then select the appropriate emergency/medical team for that particular incident and requests the server to notify the medical team.
4. The server will then immediately fetch the victim's details (i.e. Medical details and Emergency contacts) using the victim's user id from the database and notify the emergency/medical team (as selected by admin in step 3) about the incident along with all the necessary details of the victim.
5. The Emergency team will then respond to the request assigned by the admin and thus notify the Server that they are going to take care of this emergency or accident.
6. The server will therefore notify the admin that the emergency team will shortly reach the incident point.
7. Once the Emergency team arrives at the incident point then they will notify the server about the Hospital's details to which they are taking the victim/patient to.
8. The Server will then notify the victim's emergency contacts using an SMS along with the details of the Hospital.

In some embodiments, the emergency team does not provide the server with information about the Hospital details. Furthermore, in some embodiments, a user may utilise the emergency contact details obtained from the server to notify the victim's emergency contacts.

In some embodiments, all roles which meet a specific access level may receive the accident details from the server such that the system may operate in a role-decentralised way rather than through an admin. Therefore, an admin may not select a specific emergency team to address an incident as the emergency teams will be notified.

In some embodiments, a series of structured questions and structured answers may be provided to the user who has sent the emergency indication to enable the capture of additional information to coordinate and/or augment the incident details. The structured questions and structured answers may be defined for a specific event type and/or a specific event.

In some embodiments, the recipient(s) of the emergency indication may requested further details from the user who sent the emergency indication. Questions requesting these details may be provided to the recipient(s) for their selection.

A potential advantage of some embodiments of the present invention is that, during emergencies in events, information relevant to the affected participant(s) can be rapidly obtained and accurately communicated or utilised.

A further potential advantage is that, during emergencies in event, information security is maintained by ensuring that communications are augmented with information relevant to the access level of a specific role.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for providing an emergency communications, including:
   a) a central server obtaining information from at least one of a plurality of users prior to an emergency during an event; and
   b) during an emergency, the central server coordinating communications between at least two of the plurality of users via a plurality of user devices;
   wherein the central server augments and/or coordinates communications using the information previously provided by the at least one of the plurality of users and wherein at least one of the user devices is associated with emergency services wherein, during an emergency, the central server:
- receives an indication of an emergency and an identifier for an affected user with a participant role from a user device associated with a monitor role;
- transmits a notification to the user device associated with an administrator role including the emergency indication;
- receives an approval from the user device associated with the administrator role;
- retrieves the medical and the emergency contract contact details associated with the identifier of the affected user; and
- transmits a notification and the medical and emergency contact details to the user device associated with an emergency service role.

2. A method as claimed in claim 1, wherein each of the plurality of users is associated with a role.

3. A method as claimed in claim 2, wherein each role is associated with a level of access and wherein the level of access determines at least part of the augmentation and/or coordination by the central server.

4. A method as claimed in claim 2, wherein the roles includes participant, monitor, and emergency service.

5. A method as claimed in claim 2, wherein the roles include administrator.

6. A method as claimed in claim 1 wherein the information from at least one of the plurality of users includes a location.

7. A method as claimed in claim 1, wherein, during the emergency, at least one of the users at one of the plurality of user devices provides an indication that the emergency has occurred.

8. A method as claimed in claim 7, wherein, during the emergency, a location of the emergency is determined by the central server in accordance with the previously obtained information.

9. A method as claimed in claim 1, wherein the information from at least one of the plurality of users includes personal details, medical details, and emergency contact details.

10. A method as claimed in claim 9, wherein personal details, medical details and emergency contact details are provided for each of the plurality of users with the participant role.

11. A method as claimed in claim 1, wherein the event is a motorsports event.

12. A method as claimed in claim 1, wherein the role of participants includes the role of drivers.

13. A method as claimed in claim 1, wherein the role of monitors include the role of pitcrew and the role of marshals.

14. A method as claimed in claim 1, wherein, during an emergency, the central server:
- receives hospital information from the user device associated with the emergency service role; and
- transmits a message including the hospital information using the emergency contact details associated with the identifier of the affected user.

15. An emergency communications system, including:
- a plurality of user devices, each associated with at least one of a plurality of users;
- a central server configured to obtain and store information from at least one of the plurality of users prior to an emergency during an event, and, during an emergency, coordinate communications between at least two of the plurality of users via the plurality of user devices; and
- a memory configured to store the information;
- wherein the central server augments and/or coordinates communications using the information previously provided by the plurality of users and wherein at least one of the user devices is associated with emergency services wherein, during an emergency, the central server:
- receives an indication of an emergency and an identifier for an affected user with a participant role from a user device associated with a monitor role;
- transmits a notification to the user device associated with an administrator role including the emergency indication;
- receives an approval from the user device associated with the administrator role;
- retrieves the medical and the emergency contact details associated with the identifier of the affected user; and
- transmits a notification and the medical and emergency contact details to the user device associated with an emergency service role.

16. A non-transitory computer readable medium storing a computer program that performs the method of claim 1 when executed by at least one computer processor.

* * * * *